(12) United States Patent
Sugiyama

(10) Patent No.: US 11,914,233 B2
(45) Date of Patent: Feb. 27, 2024

(54) OPTICAL DEVICE AND OPTICAL COMMUNICATION DEVICE

(71) Applicant: FUJITSU OPTICAL COMPONENTS LIMITED, Kawasaki (JP)

(72) Inventor: Masaki Sugiyama, Kawasaki (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 138 days.

(21) Appl. No.: 17/715,336

(22) Filed: Apr. 7, 2022

(65) Prior Publication Data
US 2022/0397781 A1  Dec. 15, 2022

(30) Foreign Application Priority Data
Jun. 11, 2021  (JP) .................................. 2021-098234

(51) Int. Cl.
*G02F 1/035* (2006.01)
*H04B 10/50* (2013.01)
*G02F 1/21* (2006.01)
*G02F 1/225* (2006.01)

(52) U.S. Cl.
CPC ............ *G02F 1/0356* (2013.01); *G02F 1/212* (2021.01); *G02F 1/225* (2013.01); *H04B 10/501* (2013.01); *G02F 2202/20* (2013.01)

(58) Field of Classification Search
CPC ........................... H04B 10/505; G02F 1/0356
See application file for complete search history.

(56) References Cited

U.S. PATENT DOCUMENTS

| | | | |
|---|---|---|---|
| 2002/0048076 A1* | 4/2002 | Kondo | G02F 1/0356 |
| | | | 359/322 |
| 2010/0080504 A1* | 4/2010 | Shetrit | G02F 1/2257 |
| | | | 385/14 |
| 2013/0039612 A1 | 2/2013 | Sugiyama et al. | |
| 2020/0363662 A1* | 11/2020 | Yu | G02B 6/12 |

FOREIGN PATENT DOCUMENTS

JP  2013-37243  2/2013

* cited by examiner

*Primary Examiner* — Shi K Li
(74) *Attorney, Agent, or Firm* — STAAS & HALSEY LLP

(57) ABSTRACT

An optical device includes an optical waveguide, a buffer layer that is layered on the optical waveguide, and an opening that is formed at least in the buffer layer above a part near a side surface of the optical waveguide. The optical device further includes an electrode that is layered in the opening and that is configured to apply a signal to the optical waveguide and a silicon layer that is layered on the buffer layer excluding the opening.

11 Claims, 6 Drawing Sheets

OPTICAL DEVICE AND OPTICAL COMMUNICATION DEVICE

CROSS-REFERENCE TO RELATED APPLICATION

This application is based upon and claims the benefit of priority of the prior Japanese Patent Application No. 2021-098234, filed on Jun. 11, 2021, the entire contents of which are incorporated herein by reference.

FIELD

The embodiments discussed herein are related to an optical device and an optical communication device.

BACKGROUND

A conventional optical modulator consists of optical waveguides that are provided on a substrate and a modulator that is provided near the optical waveguide. The modulator includes a signal electrode and a ground electrode and, when a voltage is applied to the signal electrode, an electric field is generated in the optical waveguide and accordingly the refractive index of the optical waveguide varies and the phase of light varies. The optical waveguides configure a Mach-Zehnder interferometer and an optical phase difference between waveguides changes the light output.

In the optical modulator, for example, four-channel Mach-Zehnder modulators are integrated. Each Mach-Zehnder interferometer includes an RF modulator and a DC modulator. For example, a high-frequency signal having a bandwidth of few tens of GHz is input to an electrode of the RF modulator to perform fast modulation. A bias voltage is applied to an electrode of the DC modulator and the bias voltage is adjusted such that on/off of an electric signal corresponds to on/off of an optical signal.

The optical waveguides of the optical modulator, for example, configure a Mach-Zehnder interferometer and output IQ signals obtained by performing XY polarization multiplexing according to a phase difference of light between a plurality of optical waveguides that are arranged in parallel. Outputs of four channels are combined by every two channels into two IQ signals and polarization rotation is performed on one of the two IQ signals and a polarization beam combiner performs polarization multiplexing and makes an output.

On the other hand, the optical waveguides includes, for example, a diffusion optical waveguide that is formed in a position not overlapping the signal electrode by diffusing metal, such as titanium, from a surface of the substrate. The diffusion optical waveguide however has small light confinement and thus the efficiency in applying an electric field is poor and thus the drive voltage increases. Thus, there is a film optical waveguide in which an optical waveguide using a film of lithium niobate (LN) crystal is formed in a position not overlapping the signal electrode. The film optical waveguide makes it possible to enhance light enclosure more than the diffusion optical waveguide in which metal is diffused, improve the efficiency in applying an electric field, and reduce the drive voltage.

The optical modulator includes the RF modulator and the DC modulator. FIG. 9 is a schematic cross-sectional view illustrating an example of an RF modulator 200 of an optical modulator. The RF modulator 200 illustrated in FIG. 9 includes a support substrate 201 of silicon (Si), or the like, and an intermediate layer 202 that is layered on the support substrate 201. The RF modulator 200 further includes a film LN substrate 203 that is layered on the intermediate layer 202 and a buffer layer 204 of $SiO_2$ that is layered on the film LN substrate 203.

Protruding film optical waveguides 207 that protrude upward are formed on the film LN substrate 203. The film LN substrate 203 and the film optical waveguides 207 are covered with a buffer layer 204 and a signal electrode 205 and a pair of ground electrodes 206 that form a coplanar (coplanar waveguide (CPW)) structure are arranged on the surface of the buffer layer 204. In other words, the signal electrode 205 and the ground electrodes 206 in a pair with the signal electrode 205 in between are arranged on the buffer layer 204. Note that the buffer layer 204 makes it possible to prevent light that propagates through the film optical waveguides 207 from being absorbed into the signal electrode 205 and the ground electrodes 206.

The protruding film optical waveguide 207 is formed on the film LN substrate 203 that is positioned between the signal electrode 205 and the ground electrode 206. The protruding film optical waveguide 207 includes a side wall face 207A and a flat face 207B. Furthermore, the buffer layer 204 that is positioned between the signal electrode 205 and the ground electrode 206 has a step 204A that covers the entire protruding film optical waveguide 207.

According to the film optical waveguide 207 described above, generating an electric field by applying a high-frequency signal to the signal electrode 205 and changing a refractive index of the film optical waveguide 207 make it possible to modulate light that propagates through the film optical waveguide 207 by changing a refractive index of the film optical waveguides 207. Note that, while the DC modulator is different from the RF modulator 200 in that the DC modulator applies a bias voltage instead of a high-frequency signal to the signal electrode 205, the DC modulator is approximately the same structure as that of the RF modulator 200 and description of the configuration and operations of the DC modulator will be omitted.

Patent Literature 1: Japanese Laid-open Patent Publication No. 2013-37243

In the film optical waveguides 207 of the optical modulator, because the buffer layer 204 serves as a cladding, a mode field of light that propagates through the film optical waveguide 207 enters the buffer layer 204. By increasing the thickness of the buffer layer 204, it is possible to prevent the light in the film optical waveguides 207 from being absorbed into the signal electrode 205 and the ground electrodes 206. Increasing the thickness of the buffer layer 204, however, reduces the electric filed that is applied to the film optical waveguides 207, which therefore lowers efficiency in applying an electric field.

SUMMARY

According to an aspect of an embodiment, an optical device includes an optical waveguide, a buffer layer, an opening, an electrode and a silicon layer. The buffer layer is layered on the optical waveguide. The opening is formed at least in the buffer layer above a part near a side surface of the optical waveguide. The electrode is layered in the opening and is configured to apply a signal to the optical waveguide. The silicon layer is layered on the buffer layer excluding the opening.

The object and advantages of the invention will be realized and attained by means of the elements and combinations particularly pointed out in the claims.

DESCRIPTION OF EMBODIMENTS

Figure 9:
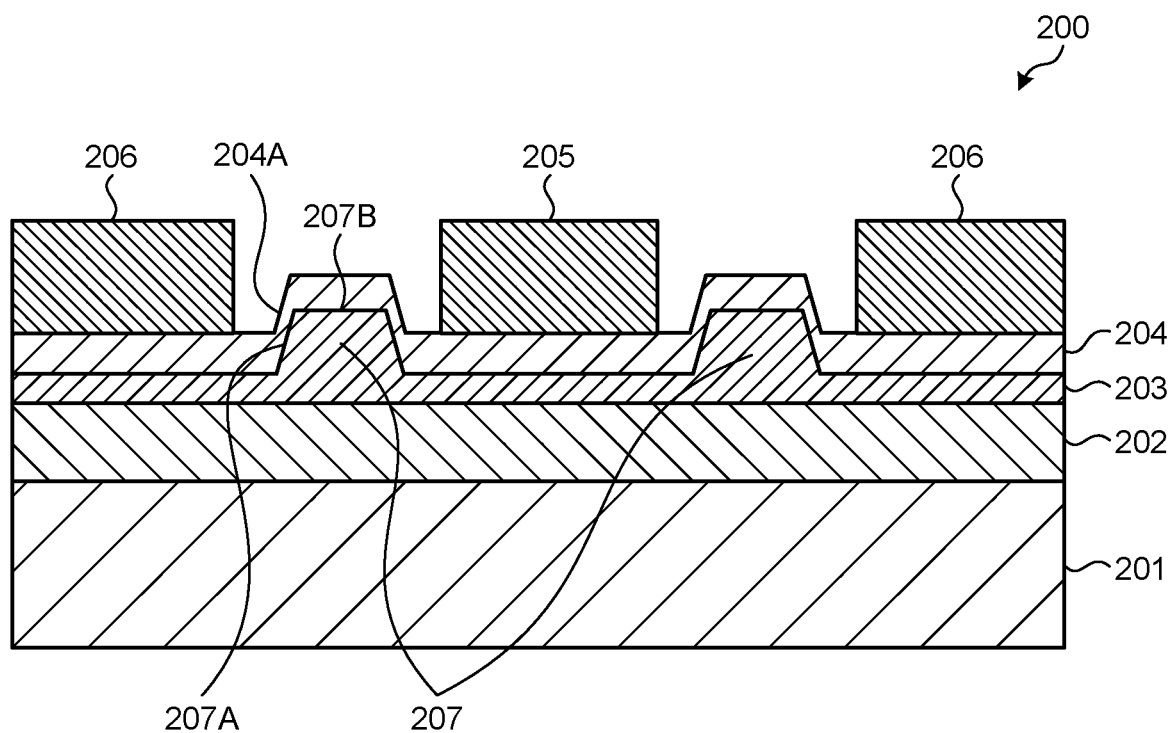
FIG. 9 is a schematic cross-sectional view illustrating an example of an RF modulator of an optical modulator.

In the RF modulator 200 of the optical modulator illustrated in FIG. 9, increasing the thickness of the buffer layer 204 increases the distance between the film optical waveguides 207 and the signal electrode 205 (ground electrodes 206) so that the electric field that is applied from the signal electrode 205 to the film optical waveguides 207 is small. As a result, efficiency in applying an electric field lowers. Thus, an RF modulator 100 of an optical modulator of a comparative example that makes it possible to improve efficiency in applying an electric field even when the thickness of the buffer layer 204 is increased has been devised.

Comparative Example

Figure 8:
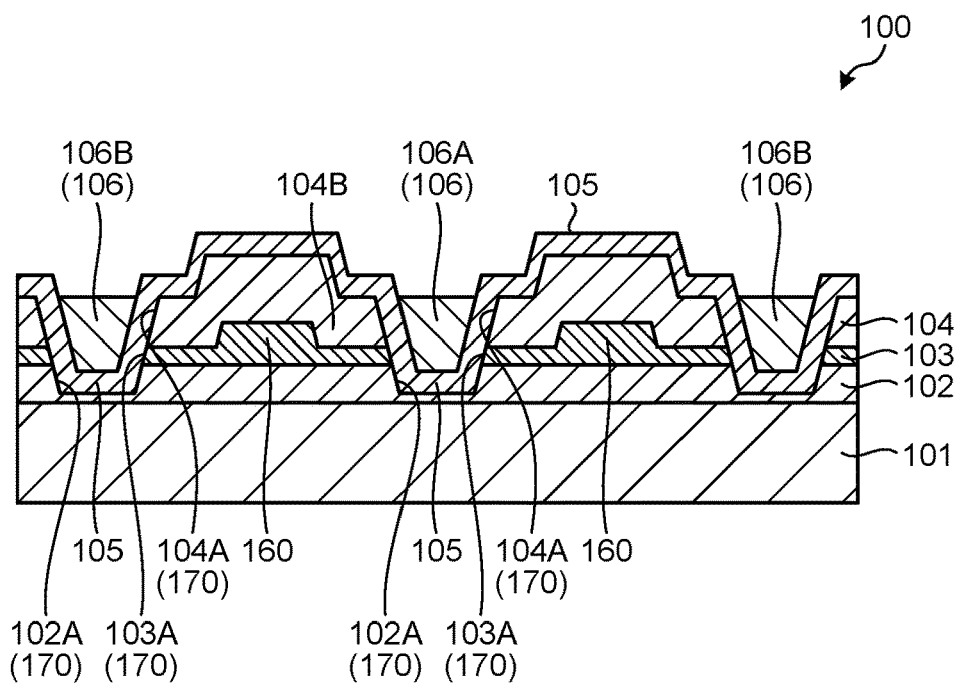
FIG. 8 is a schematic cross-sectional view illustrating an example of an RF modulator of an optical modulator of a comparative example.

FIG. 8 is a schematic cross-sectional view illustrating an example of the RF modulator 100 of the optical modulator of the comparative example. The RF modulator 100 illustrated in FIG. 8 includes a support substrate 101 and an intermediate layer 102 that is layered on the support substrate 101. The RF modulator 100 further includes a film LN substrate 103 that is layered on the intermediate layer 102, a buffer layer 104 that is layered on the film LN substrate 103, a silicon layer 105 that is layered on the buffer layer 104, and an electrode part 106. The electrode part 106 includes a signal electrode 106A and ground electrodes 106B in a pair.

Protruding film optical waveguides 160 that protrude upward are formed on the film LN substrate 103. The film LN substrate 103 and the film optical waveguides 160 are covered with the buffer layer 104. The buffer layer 104 is provided in order to prevent light that propagates through the film optical waveguides 160 from being absorbed into the electrode part 106. A first opening 103A is formed partly in a part (slab) of the film LN substrate 103 near the film optical waveguide 160. A second opening 104A that communicates with the first opening 103A is formed in a part of the buffer layer 104 above the first opening 103A that is formed in the part (slab) of the film LN substrate 103. Furthermore, a third opening 102A that communicates with the first opening 103A is formed in a part of the intermediate layer 102 under the first opening 103A. The first opening 103A, the second opening 104A and the third opening 102A form an opening 170.

Furthermore, the silicon layer 105 is provided in order to prevent localization of charges that occur due to a change in temperature and stabilize temperature properties. The silicon layer 105 covers the buffer layer 104 and the opening 170. The electrode part 106 is layered on the silicon layer 105 in the opening 170.

The protruding film optical waveguide 160 is formed on the film LN substrate 103 that is positioned between the signal electrode 106A and the ground electrode 106B. Furthermore, there is a step 104B that covers the entire protruding film optical waveguide 160 is in the buffer layer 104 that is positioned between the signal electrode 106A and the ground electrode 106B.

The film LN substrate 103 is interposed between the intermediate layer 102 and the buffer layer 104 and the protruding film optical waveguide 160 that protrudes upward is formed on the film LN substrate 103. The film LN substrate 103 and the film optical waveguides 160 are covered with the buffer layer 104 and the silicon layer 105 and the signal electrode 106A and the ground electrode 106B are exposed from a part of the silicon layer 105 overlapping the opening 170.

The signal electrode 106A is, for example, an electrode made of a metal material, such as gold or copper. The ground electrode 106B is, for example, an electrode made of a metal material, such as gold or copper. In the RF modulator 100, a high-frequency signal corresponding to an electric signal is transmitted by the signal electrode 106A and accordingly an electric field in a direction from the signal electrode 106A to the ground electrode 106B is generated and the electric field is applied to the film optical waveguide 160. As a result, the refractive index of the film optical waveguide 160 changes according to application of the electric field to the film optical waveguide 160, which makes it possible to modulate light that propagates through the film optical waveguide 160.

The ground electrode 106B and the signal electrode 106A are arranged in the opening 170 and accordingly the distance between the ground electrode 106B and the film optical waveguide 160 and the distance between the signal electrode 106A and the film optical waveguide 160 are small. As a result, even when the thickness of a buffer layer 54 increases, it is possible to improve efficiency in applying an electric field.

The silicon layer 105 however is close to the film LN substrate 103 on both sides of the film optical waveguide 160. The silicon layer 105 has a high light refractive index and therefore, when the silicon layer 105 is close to the film LN substrate 103, the light in the film optical waveguide 160 is drawn and a light loss increases.

Preferred embodiments of the present invention will be explained with reference to accompanying drawings. The embodiments do not limit the disclosure.

[a] First Embodiment

Figure 1:
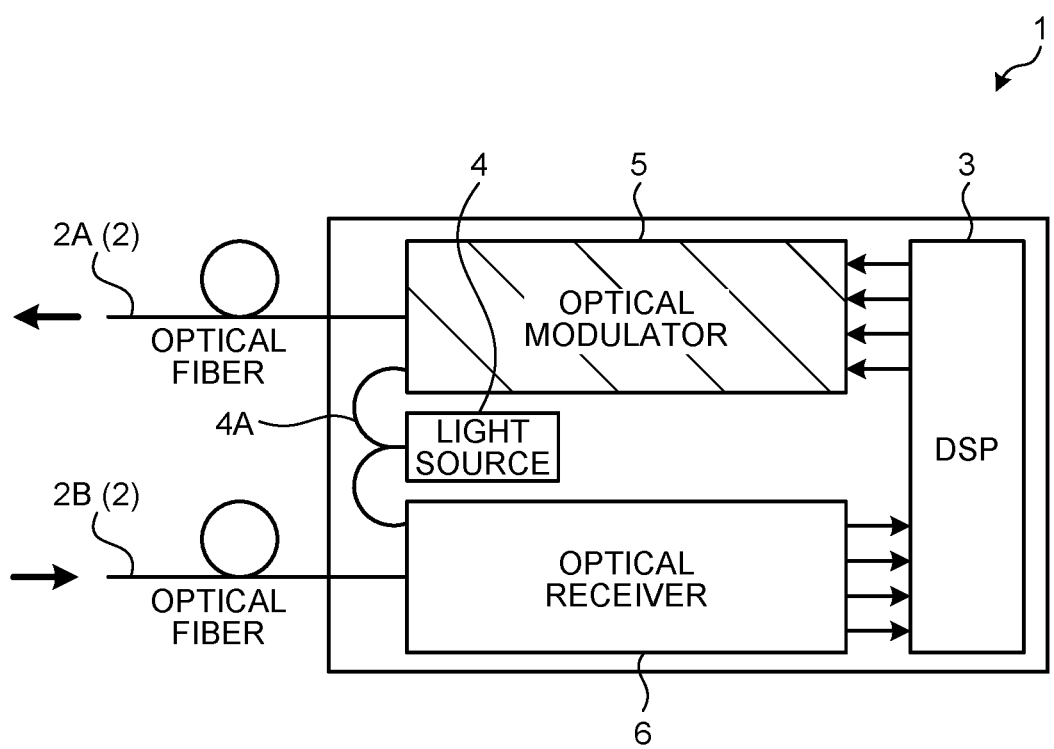
FIG. 1 is a block diagram illustrating an example of a configuration of an optical communication device of a first embodiment.

FIG. 1 is a block diagram illustrating an example a configuration of an optical communication device 1 of a first embodiment. The optical communication device 1 illustrated in FIG. 1 is connected to an optical fiber 2A (2) on an output side and an optical fiber 2B (2) on an input side. The optical communication device 1 includes a digital signal processor (DSP) 3, a light source 4, an optical modulator 5, and an optical receiver 6. The DSP 3 is an electric part that executes digital signal processing. The DSP 3, for example, executes processing, such as coding of transmission data, generates an electric signal containing the transmission data, and outputs the generated electric signal to the optical modulator 5. The DSP 3 acquires an electric signal containing reception data from the optical receiver 6 and executes processing, such as decoding of the acquired electric signal, thereby obtaining the reception data.

The light source 4 includes, for example, a laser diode, etc., generates light of a given wavelength, and supplies the generated light to the optical modulator 5 and the optical receiver 6. The optical modulator 5 is an optical device that modulates light that is supplied from the light source 4 according to an electric signal that is output from the DSP 3 and that outputs a resultant optical transmission signal to the optical fiber 2A. The optical modulator 5 is, for example, an optical device, such as a lithium niobate (LN) optical modulator including a LN optical waveguide and a modulator. The LN optical waveguide is formed of a substrate of LN crystal. When light that is supplied from the light source 4 propagates through the LN optical waveguide, the optical modulator 5 modulates the light according to an electric signal that is input to the modulator, thereby generating an optical transmission signal.

The optical receiver 6 receives an optical signal from the optical fiber 2B and demodulates the received optical signal using light that is supplied from the light source 4. The optical receiver 6 converts the demodulated received optical signal into an electric signal and outputs the electric signal after the conversion to the DSP 2.

Figure 2:
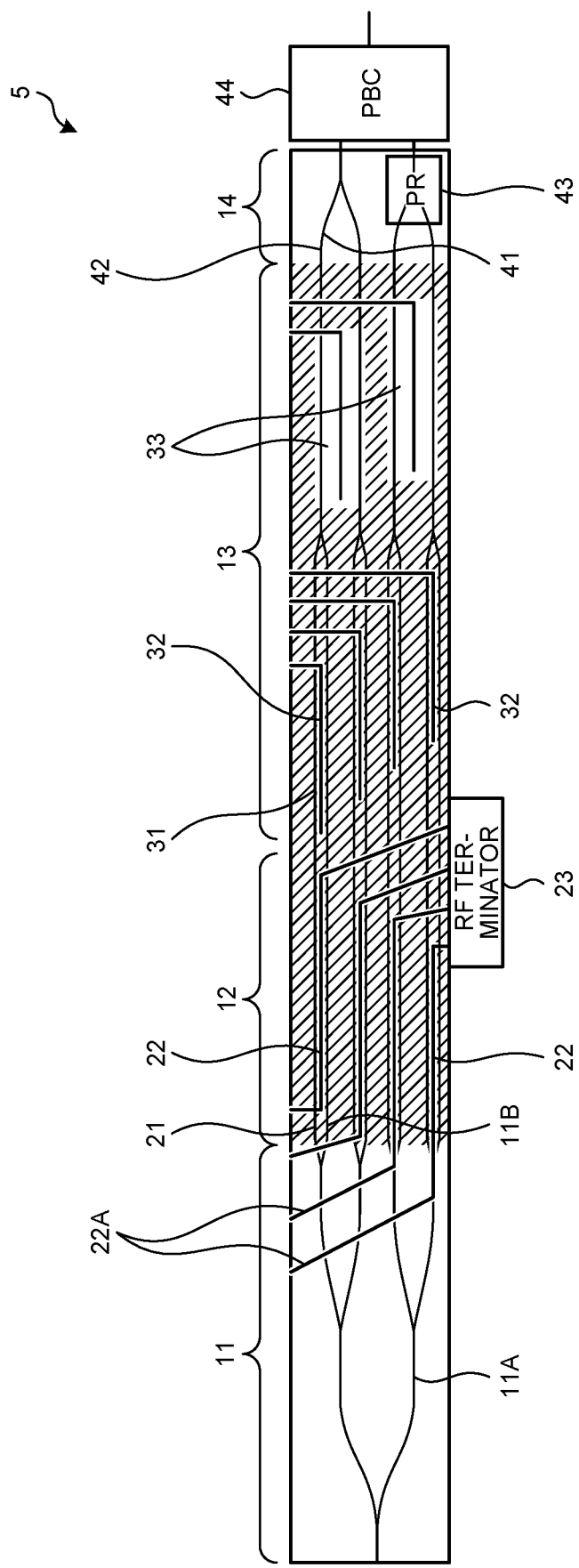
FIG. 2 is a plane schematic view illustrating an example of a configuration of an optical modulator of the first embodiment.

FIG. 2 is a plane schematic view illustrating an example of a configuration of the optical modulator 5 according to the first embodiment. In the optical modulator 5 illustrated in FIG. 2, the optical fiber 4A from the light source 4 is connected to an input side and the optical fiber 2A for outputting a transmission signal is connected to an output side. The optical modulator 5 includes a first optical input unit 11, a radio frequency (RF) modulator 12, a direct current (DC) modulator 13, and a first optical output unit 14. The first optical input unit 11 includes a first optical waveguide 11A and a first waveguide joint 11B. The first optical waveguide 11A includes a single optical waveguide that is connected to the optical fiber 4A, two optical waveguides into which the single optical waveguide bifurcates, four optical waveguides into which the two optical waveguides bifurcate, and eight optical waveguides into which the four optical waveguides bifurcate. The first waveguide joint 11B joins the eight optical waveguides in the first optical waveguide 11A and eight LN optical waveguides in a LN optical waveguide 21.

The RF modulator 12 includes the LN optical waveguide 21, an electrode part 22, and an RF terminator 23. When light that is supplied from the first optical waveguide 11A propagates through the LN optical waveguide 21, the RF modulator 12 modulates the light using an electric field that is applied from a signal electrode 22A of the electrode part 22. The LN optical waveguide 21 is, for example, an optical waveguide that is formed using a film LN substrate 53, that repeats bifurcating from the input side and that thus includes eight parallel LN optical waveguides. The light that propagates through the LN optical waveguide 21 and is modulated is output to a first DC modulator 32 in the DC modulator 13. The film LN substrate 53 is an X-cut substrate whose refractive index increases when a DC voltage is applied in the direction of an X-axis of crystal.

The signal electrode 22A in the electrode part 22 is provided in a position not overlapping the LN optical waveguide 21 and applies an electric field to the LN optical waveguide 21 according to an electric signal that is output from the DSP 3. The terminal of the signal electrode 22A in the electrode part 22 is connected to the RF terminator 23. The RF terminator 23 is connected to the terminal of the signal electrode 22A and prevents unnecessary reflection of the signal that is transmitted by the signal electrode 22A.

The DC modulator 13 includes an LN optical waveguide 31 that is joined to the LN optical waveguide 21 of the RF modulator 12, the first DC modulator 32, and a second DC modulator 33. The first DC modulator 32 includes four child Mach-Zehnders (MZ). The second DC modulator 33 includes two parent Mach-Zehnders (MZ). The first DC modulator 32 includes an NL optical waveguide 31 and the electrode part 22.

The LN optical waveguide 31 includes eight LN optical waveguides and four LN optical waveguides that join two LN optical waveguides among the eight LN optical waveguides. In the eight LN optical waveguides 31, the first DC modulator 32 is arranged at every two LN optical waveguides. The first DC modulator 32 applies a bias voltage to the signal electrode 22A above the LN optical waveguide 31, thereby adjusts the bias voltage such that on/off of an electric signal corresponds to on/off of an optical signal, and outputs an I signal of an in-phase component or a Q signal of a quadrature component. In the four LN optical waveguides in the LN optical waveguide 31, the second DC modulator 33 is arranged at every two LN optical waveguides. The second DC modulator 33 applies a bias voltage to the signal electrode 22A above the LN optical waveguide 31, thereby adjusts a bias voltage such that on/off of an electric signal corresponds to on/off of an optical signal, and outputs an I signal or a Q signal.

The first optical output unit 14 includes a second waveguide joint 41, a second optical waveguide 42, a polarization rotator (PR) 43, and a polarization beam combiner (PBC) 44. The second waveguide joint 41 joins the LN optical waveguide 31 in the DC modulator 13 and the second optical modulator 42. The second optical waveguide 42 includes four optical waveguides that are connected to the second waveguide joint 41 and two optical waveguides that join two optical waveguides among the four optical waveguides.

The PR 43 rotates the I signal or the Q signal that is input from one of the second DC modulators 33 by 90 degrees and obtains a vertically-polarized optical signal after the 90 degree rotation. The PR 43 inputs the vertically-polarized optical signal to the PBC 44. The PBC 44 multiplexes the vertically-polarized optical signal from the PR 43 and a horizontally-polarized optical signal from the other second DC modulator 33 and outputs a polarization multiplexed signal.

Figure 3:
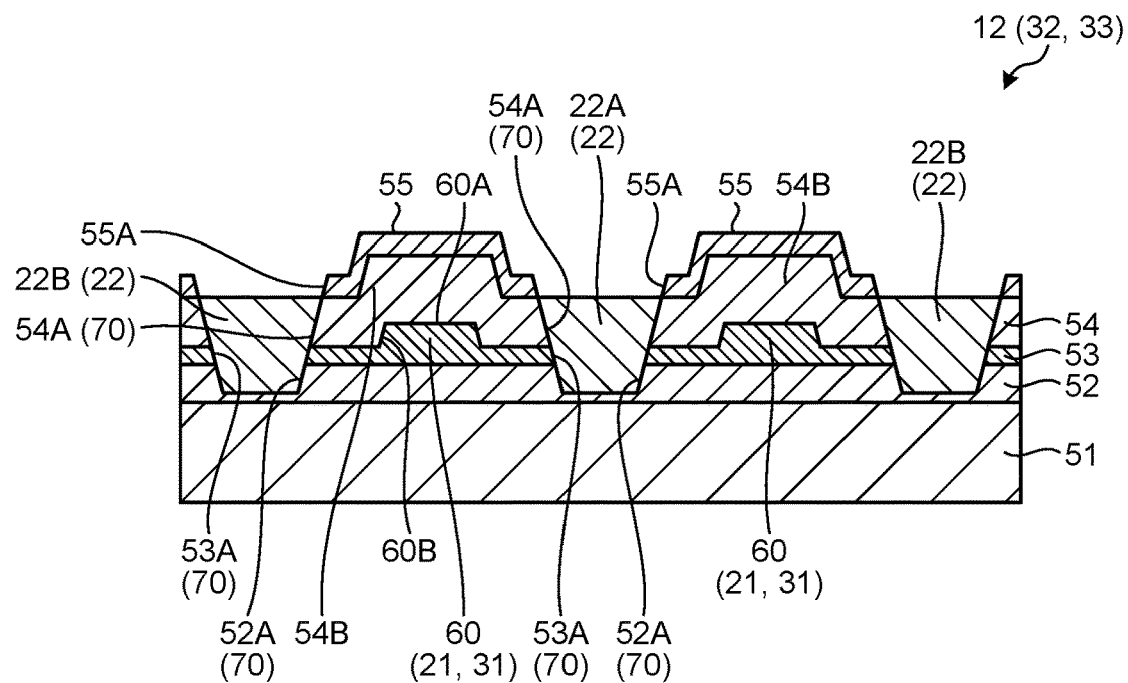
FIG. 3 is a schematic cross-sectional view illustrating an example of an RF modulator of the optical modulator of the first embodiment.

A configuration of the optical modulator 5 of the first embodiment will be described specifically next. FIG. 3 is a schematic cross-sectional view illustrating an example of the RF modulator 12 of the optical modulator 5 of the first embodiment. The RF modulator 12 illustrated in FIG. 3 includes a support substrate 51 and an intermediate layer 52 that is layered on the support substrate 51. The RF modulator 12 further includes a film LN substrate 53 that is a film substrate and that is layered on the intermediate layer 52, the buffer layer 54 that is layered on the film LN substrate 53, a silicon layer 55 that is layered on the buffer layer 54, and the electrode part 22. The electrode part 22 includes the signal electrode 22A and ground electrodes 22B in a pair.

A protruding film optical waveguide 60 that protrudes upward is formed on the film LN substrate 53. The film optical waveguide 60 is the LN optical waveguide 21 of the RF modulator 12. The film LN substrate 53 and the film optical waveguide 60 are covered with the buffer layer 54. The buffer layer 54 is provided in order to prevent light that propagates through the film optical waveguide 60 from being absorbed into the electrode part 22. A first opening 53A is formed near a side surface of the film optical waveguide 60, for example, a part (slab) of the film LN substrate 53 on both sides. A second opening 54A that communicates with the first opening 53A is formed in a part of the buffer layer 54 above the first opening 53A that is formed in the part (slab) of the film LN substrate 53. Furthermore, a third opening 52A that communicates with the first opening 53A is formed in a part of the intermediate layer 52 below the first opening 53A. The first opening 53A, the second opening 54A and the third opening 52A form an opening 70. The electrode part 22 is layered in the opening 70.

The silicon layer 55 is provided in order to prevent localization of charges that occur due to a change in temperature and stabilize temperature properties. The silicon layer 55 is layered in the part of the buffer layer 54 excluding the opening 70. A silicon side opening 55A is formed in the part of the silicon layer 55 overlapping the second opening 54A of the buffer layer 54. Note that the silicon side opening 55A is formed by etching the silicon layer 55 in patterning of the second opening 54A of the buffer layer 54.

A protruding film optical waveguide 60 is formed on the film LN substrate 53 that is positioned between the signal electrode 22A and the ground electrode 22B. The film optical waveguide 60 is a protruding rib optical waveguide that is provided in a given position on the film LN substrate 53. The protruding film optical waveguide 60 includes a side wall face 60A and a flat face 60B. Furthermore, the buffer layer 54 that is positioned between the signal electrode 22A and the ground electrode 22B, too, has a step 54B that covers the entire protruding film optical waveguide 60. The step 54B that covers the side wall face 60A of the film optical waveguide 60 separates the ground electrode 22B and the signal electrode 22A.

The film LN substrate 53 with a thickness of 0.5 to 3 μm is interposed between the intermediate layer 52 and the buffer layer 54 and the protruding film optical waveguide 60 that protrudes upward is formed on the film LN substrate 53. The width of the protrusion serving as the film optical waveguide 60 is, for example, approximately 1 to 8 μm. The film LN substrate 53 and the film optical waveguide 60 are covered with the buffer layer 54 and the silicon layer 55 and the signal electrode 22A and the ground electrode 22B in the opening 70 are exposed from the silicon side opening 55A of the silicon layer 55. Note that the silicon layer 55 and the signal electrode 22A or the ground electrode 22B do not make contact in the silicon side opening 55A.

It is preferable that the material of the signal electrode 22A be different from that of the ground electrode 22B with a small high-frequency loss.

The signal electrode 22A is, for example, an electrode that is made of a metal material, such as gold or copper, and that has a width of 2 to 10 μm and a thickness of 1 to 20 μm. The ground electrode 22B is, for example, an electrode that is made of a metal material, such as gold or copper, and that has a thickness of 1 μm or larger. A high-frequency signal corresponding to an electric signal that is output from the DSP 3 is transmitted by the signal electrode 22A, accordingly an electric field in a direction from the signal electrode 22A to the ground electrode 22B is generated, and the electric field is applied to the film optical waveguide 60. As a result, the refractive index of the film optical waveguide 60 changes according to application of the electric field to the film optical waveguide 60, which makes it possible to modulate light that propagates through the film optical waveguide 60.

In the RF modulator 12 of the first embodiment, the ground electrode 22B and the signal electrode 22A are arranged in the opening 70. In the RF modulator 12, because the distance between the ground electrode 22B and the film optical waveguide 60 and the distance between the signal electrode 22A and the film optical waveguide 60 are set short, the electric field to be applied to the film optical waveguide 60 is strong. As a result, even when the thickness of the buffer layer 54 increases, improving efficiency in applying an electric field makes it possible to reduce a drive voltage.

Furthermore, in the RF modulator 12, compared to the RF modulator 100 of the comparative example, because the silicon layer 55 is not in the opening 70, the silicon layer 55 is never close to the film optical waveguide 60. As a result, it is possible to inhibit an optical loss due to the silicon layer 55 in which the silicon layer 55 draws light in the film optical waveguide 60 and the electrode part 22 absorbs the light.

Furthermore, the buffer layer 54 excluding the second opening 54A is covered with the silicon layer 55, which makes it possible to prevent localization of charges that occur due to a change in temperature and stabilize temperature properties.

FIG. 3 exemplifies the RF modulator 12 and the first DC modulator 32 of the DC modulator 13 has approximately the same configuration as that of the RF modulator 12. The first DC modulator 32 is different from the RF modulator 12 in that a drive voltage is applied to the signal electrode 22A instead of a high-frequency signal. Accordingly, a redundant description of the configuration and operations will be omitted. Note that the film optical waveguide 60 corresponds to the LN optical waveguide 31 of the first DC modulator 32.

In the first DC modulator 32, the ground electrode 22B and the signal electrode 22A are arranged in the opening 70. In the first DC modulator 32, because the distance between the ground electrode 22B and the film optical waveguide 60 and the distance between the signal electrode 22A and the film optical waveguide 60 are set short, an electric filed to be applied to the film optical waveguide 60 is strong. As a result, even when the thickness of the buffer layer 54 is increased, it is possible to reduce the drive voltage by improving efficiency in applying an electric field.

Furthermore, in the first DC modulator 32, compared to the RF modulator 100 of the comparative example, because the silicon layer 55 is not in the opening 70, the silicon layer 55 is never close to the film optical waveguide 60. As a result, it is possible to inhibit an optical loss due to the silicon layer 55 in which the silicon layer 55 draws light in the film optical waveguide 60 and the electrode part 22 absorbs the light.

Similarly, the second DC modulator 33 of the DC modulator 13 has approximately the same configuration as that of the RF modulator 12. The second DC modulator 33 is different from the RF modulator 12 in that a drive voltage is applied to the signal electrode 22A instead of a high-frequency signal. Accordingly, description of the redundant configuration and operations will be omitted. Note that the film optical waveguide 60 corresponds to the LN optical waveguide 31 of the second DC modulator 33.

In the second DC modulator 33, the ground electrode 22B and the signal electrode 22A are arranged in the opening 70. In the second DC modulator 33, because the distance between the ground electrode 22B and the film optical waveguide 60 and the distance between the signal electrode 22A and the film optical waveguide 60 are set short, the electric filed that is applied to the film optical waveguide 60 is strong. As a result, even when the thickness of the buffer layer 54 is increased, it is possible to reduce the drive voltage by improving efficiency in applying an electric field.

Furthermore, in the second DC modulator 33, compared to the RF modulator 100 of the comparative example, because the silicon layer 55 is not in the opening 70, the silicon layer 55 is never close to the film optical waveguide 60. As a result, it is possible to inhibit an optical loss due to the silicon layer 55 in which the silicon layer 55 draws light in the film optical waveguide 60 and the electrode part 22 absorbs the light.

Note that the case where the opening consists of the first opening 53A, the second opening 54A and the third opening 52A. Alternatively, the opening 70 may consist of only the second opening 54A of the buffer layer 54 without the first opening 53A of the film LN substrate 53 and the third opening 52A. Reducing the distance between the electrode part 22 in the opening 70 and the film optical waveguide 60 makes it possible to, even when the thickness of the buffer layer 54 is increased, reduce the drive voltage by improving efficiency in applying an electric field. The opening 70 may consist of the first opening 53A and the second opening 54A without the third opening 52A without the third opening 52A, and changes can be made appropriately.

In the RF modulator 12 of the first embodiment, there is no electrical contact between the silicon layer 55 and the signal electrode 22A and between the silicon layer 55 and the ground electrode 22B; however, it is preferable that charges that occur on the surface of the buffer layer 54 be transmitted to the electrode part 22 via the silicon layer 55 and an embodiment thereof will be described as a second embodiment below.

[b] Second Embodiment

Figure 4:
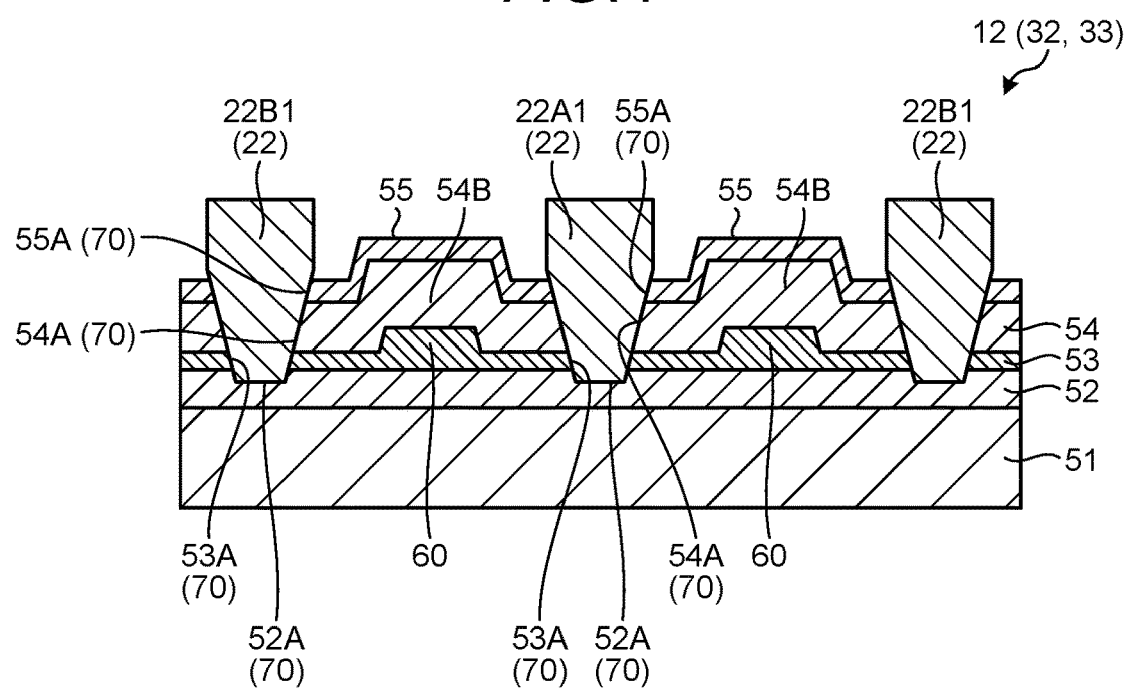
FIG. 4 is a schematic cross-sectional view illustrating an example of an RF modulator of an optical modulator of a second embodiment.

FIG. 4 is a schematic cross-sectional view illustrating an example of the RF modulator 12 of the optical modulator 5 of a second embodiment. Note that the same components as those of the optical modulator 5 of the first embodiment will be denoted with the same reference numerals as those of the first embodiment and thus description of redundant components and operations will be omitted. The RF modulator 12 illustrated in FIG. 4 is different from the RF modulator 12 illustrated in FIG. 3 in being structured such that a signal electrode 22A1 or a ground electrode 22B1 that is exposed from the silicon side opening 55A protrudes from the silicon layer 55 and electrical contact is made between the signal electrode 22A1 and the silicon layer 55 and between the ground electrode 22B1 and the silicon layer 55. In the RF modulator 12, for example, the electrode part 22 is formed in the opening 70 with the positions of a pattern of the second opening 54A of the buffer layer 54 and a pattern of the electrode part 22 being kept in line with each other.

The RF modulator 12 of the second embodiment is structured such that electrical contact is made between the signal electrode 22A1 and the silicon layer 55 and between the ground electrode 22B1 and the silicon layer 55 and thus charges that occur on the surface of the buffer layer 54 are transmitted to the electrode part 22 via the silicon layer 55. As a result, localization of the charges due to a change in temperature is avoided, which makes it possible to stabilize temperature properties.

In the first DC modulator 32, electrical contact is made between the signal electrode 22A1 and the silicon layer 55 and between the ground electrode 22B1 and the silicon layer 55 and thus charges that occur on the surface of the buffer layer 54 are transmitted to the electrode part 22 via the silicon layer 55. As a result, localization of the charges due to a change in temperature is avoided, which makes it possible to stabilize temperature properties.

In the second DC modulator 33, electrical contact is made between the signal electrode 22A1 and the silicon layer 55 and between the ground electrode 22B1 and the silicon layer 55 and thus charges that occur on the surface of the buffer layer 54 are transmitted to the electrode part 22 via the silicon layer 55. As a result, localization of the charges due to a change in temperature is avoided, which makes it possible to stabilize temperature properties.

In the RF modulator 12 of the second embodiment, for example, in the case where a positional difference between the pattern of the second opening 54A of the buffer layer 54 and the pattern of the electrode part 22 occurs when the electrode part 22 is formed, no electrical contact may be made between the signal electrode 22A and the silicon layer 55 or between the ground electrode 22B and the silicon layer 55. An embodiment of the optical modulator 5 for dealing with such a situation will be described as a third embodiment.

[c] Third Embodiment

Figure 5:
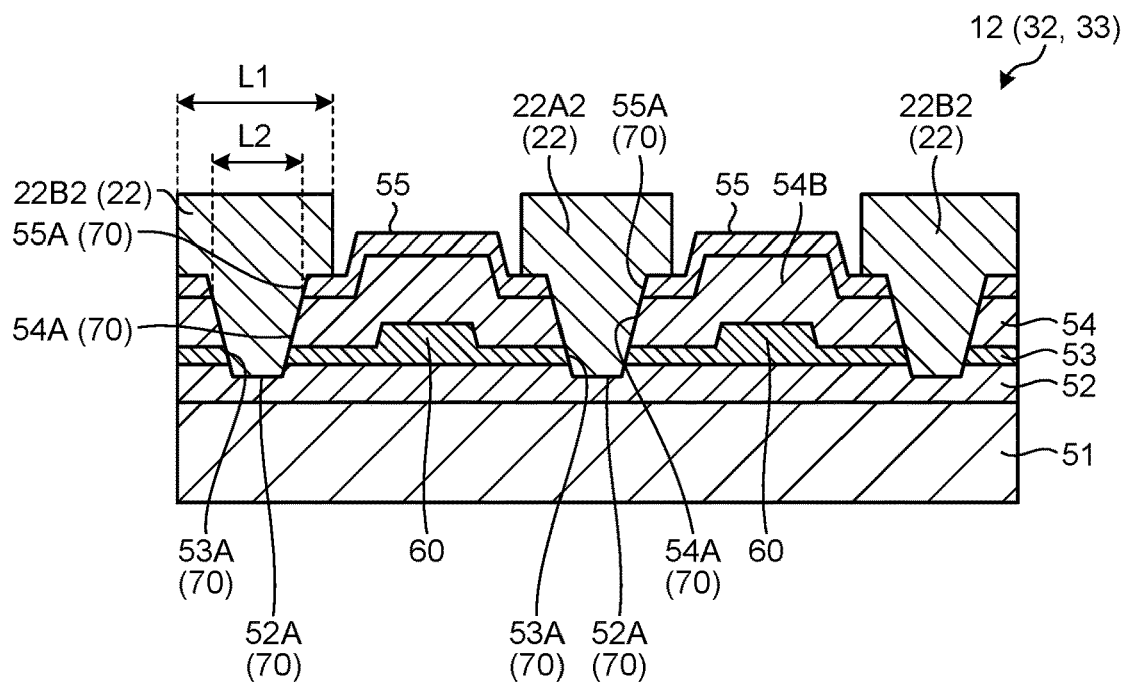
FIG. 5 is a schematic cross-sectional view illustrating an example of an RF modulator of an optical modulator of a third embodiment.

FIG. 5 is a schematic cross-sectional view illustrating an example of the RF modulator 12 of an optical modulator of a third embodiment. Note that the same components as those of the optical modulator 5 of the second embodiment will be denoted with the same reference numerals as those of the second embodiment and thus description of redundant components and operations will be omitted. The RF modulator 12 illustrated in FIG. 5 is different from the RF modulator 12 illustrated in FIG. 4 in being structured such that the electrode part 22 that is exposed from the silicon side opening 55A has a width L1 that is wider than an opening width L2 of the silicon side opening 55A. A signal electrode 22A2 that is exposed from the silicon side opening 55A has the width L1 that is wider than the opening width L2 of the silicon side opening 55A. Furthermore, a ground electrode 22B2 that is exposed from the silicon side opening 55A has the width L1 wider than the opening width L2 of the silicon side opening 55A.

In the RF modulator 12 of the third embodiment, the width L1 of the signal electrode 22A2 or the ground electrode 22B2 is set wider than the opening width L2 of the silicon side opening 55A. As a result, even when a positional difference between the pattern of the second opening 54A of the buffer layer 54 and the pattern of the electrode part 22 occurs, it is possible to enable electrical contact between the signal electrode 22A2 and the silicon layer 55 and between the ground electrode 22B2 and the silicon layer 55.

In the first DC modulator 32, the width L1 of the signal electrode 22A2 or the ground electrode 22B2 is set wider than the opening width L2 of the silicon side opening 55A. As a result, even when a positional difference between the pattern of the second opening 54A of the buffer layer 54 and the pattern of the electrode part 22 occurs, it is possible to enable electrical contact between the signal electrode 22A2 and the silicon layer 55 and between the ground electrode 22B2 and the silicon layer 55.

In the second DC modulator 33, the width L1 of the signal electrode 22A2 or the ground electrode 22B2 is set wider than the opening width L2 of the silicon side opening 55A. As a result, even when a positional difference between the pattern of the second opening 54A of the buffer layer 54 and the pattern of the electrode part 22 occurs, it is possible to enable electrical contact between the signal electrode 22A2 and the silicon layer 55 and between the ground electrode 22B2 and the silicon layer 55.

As for the RF modulator 12 of the third embodiment, the case where, to remove the silicon layer 55 excluding the surface of the buffer layer 54, the silicon layer 55 is etched by patterning the second opening 54A of the buffer layer 54 and the silicon side opening 55A is formed is exemplified. Etching is however not limited to this and an embodiment thereof will be described as a fourth embodiment below.

[d] Fourth Embodiment

Figure 6:
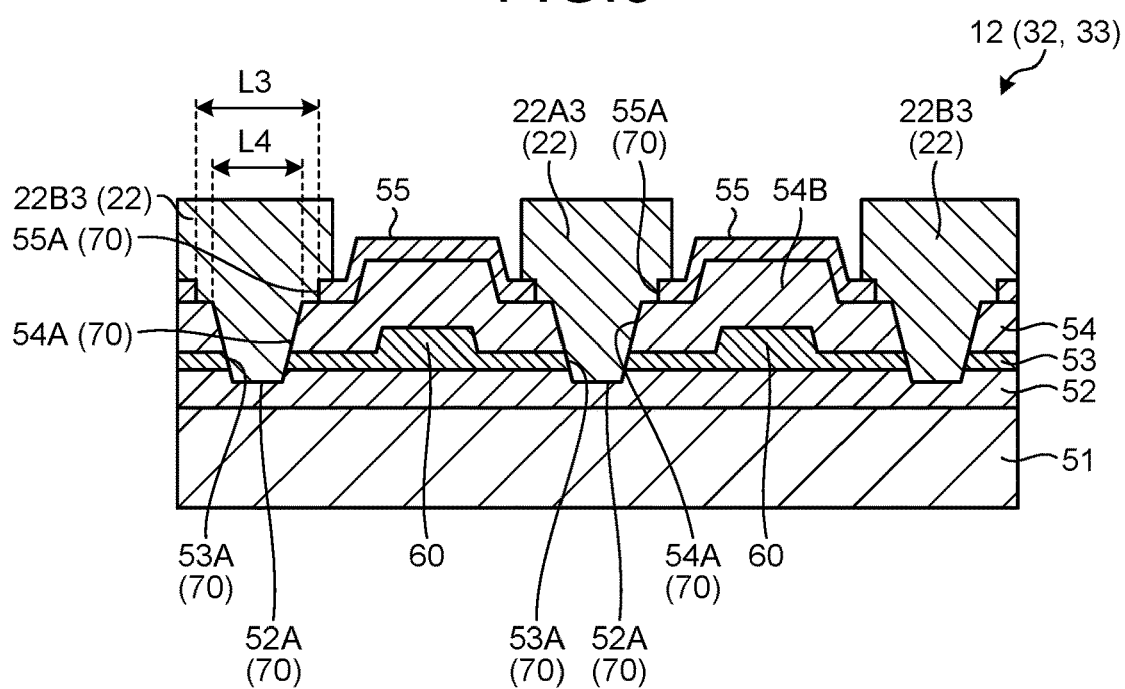
FIG. 6 is a schematic cross-sectional view illustrating an example of an RF modulator of an optical modulator of a fourth embodiment.

FIG. 6 is a schematic cross-sectional view illustrating an example of the RF modulator 12 of the optical modulator 5 of a fourth embodiment. Note that the same components as those of the optical modulator of the second embodiment will be denoted with the same reference numerals as those of the second embodiment and thus description of redundant components and operations will be omitted. The RF modulator 12 illustrated in FIG. 6 is different from the RF modulator 12 illustrated in FIG. 4 in that the silicon side opening 55A of the silicon layer 55 has an opening width L3 that is wider than an opening width L4 of the second opening 54A of the buffer layer 54. Patterning in which the silicon side opening 55A is etched and patterning in which the second opening 54A is etched are executed separately. The patterning enables absorption of a difference between the pattern obtained by etching the silicon side opening 55A and a pattern obtained by etching the second opening 54A.

A signal electrode 22A3 is formed in the opening 70 because the opening width L3 of the silicon side opening 55A of the silicon layer 55 is set wider than the opening width L4 of the second opening 54A of the buffer layer 54. Furthermore, a ground electrode 22B3 is formed in the opening 70 because the opening width L3 of the silicon side opening 55A of the silicon layer 55 is set wider than the opening width L4 of the second opening 54A of the buffer layer 54.

In the RF modulator 12 of the fourth embodiment, the opening width L3 of the silicon side opening 55A of the silicon layer 55 is set wider than the opening width L4 of the second opening 54A of the buffer layer 54. As a result, it is possible to inhibit degradation of the yield ratio due to a positional difference between the pattern obtained by etching the silicon side opening 55A of the silicon layer 55 and the pattern obtained by etching the second opening 54A of the buffer layer 54.

In the first DC modulator 32, the opening width L3 of the silicon side opening 55A of the silicon layer 55 is set wider than the opening width L4 of the second opening 54A of the buffer layer 54. As a result, it is possible to inhibit degradation of the yield ratio due to a positional difference between the pattern obtained by etching the silicon side opening 55A of the silicon layer 55 and the pattern obtained by etching the second opening 54A of the buffer layer 54.

In the second DC modulator 33, the opening width L3 of the silicon side opening 55A of the silicon layer 55 is set wider than the opening width L4 of the second opening 54A of the buffer layer 54. As a result, it is possible to inhibit degradation of the yield ratio due to a positional difference between the pattern obtained by etching the silicon side opening 55A of the silicon layer 55 and the pattern obtained by etching the second opening 54A of the buffer layer 54.

Note that, in the RF modulator 12 of the fourth embodiment, the silicon layer 55 on the buffer layer 54 draws light in the film optical waveguide 60 and thus is a cause of an increase in absorption of light into the electrode part 22. An embodiment for dealing with such a situation will be described as a fifth embodiment below.

[e] Fifth Embodiment

Figure 7:
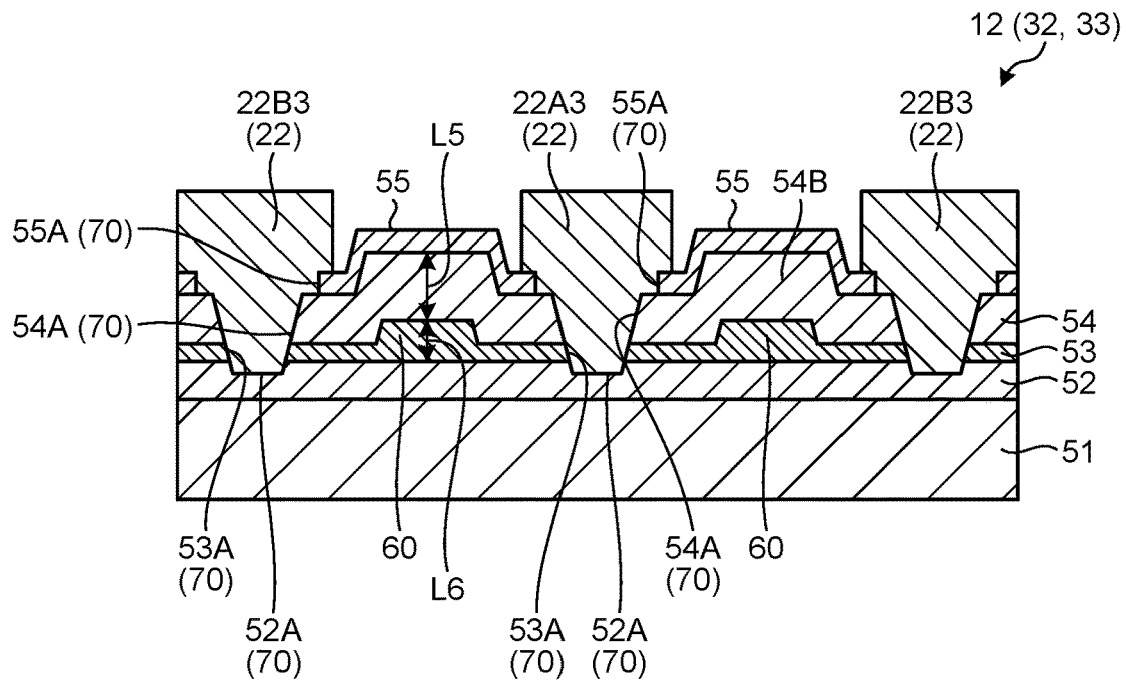
FIG. 7 is a schematic cross-sectional view illustrating an example of an RF modulator of an optical modulator of a fifth embodiment.

FIG. 7 is a schematic cross-sectional view illustrating an example of the RF modulator 12 of the optical modulator 5 of a fifth embodiment. Note that the same components as those of the optical modulator 5 of the fourth embodiment will be denoted with the same reference numerals as those of the fourth embodiment and thus description of redundant components and operations will be omitted. The RF modulator 12 illustrated in FIG. 7 is different from the RF modulator 12 illustrated in FIG. 4 in that the buffer layer 54 has a thickness L5 that is larger than a thickness L6 of the film optical waveguide 60 according to the size of the mode field of light that propagates through the film optical waveguide 60.

In the RF modulator 12 of the fifth embodiment, the thickness L5 of the buffer layer 54 is set larger than the thickness L6 of the film optical waveguide 60 and thus the amount of light in the film optical waveguide 60 that the silicon layer 55 on the buffer layer 54 draws is reduced, which makes it possible to inhibit absorption of the light into the electrode part 22.

In the first DC modulator 32, the thickness L5 of the buffer layer 54 is set larger than the thickness L6 of the film optical waveguide 60 and thus the amount of light in the film optical waveguide 60 that the silicon layer 55 on the buffer layer 54 draws is reduced, which makes it possible to inhibit absorption of the light into the electrode part 22.

In the second DC modulator 33, the thickness L5 of the buffer layer 54 is set larger than the thickness L6 of the film optical waveguide 60 and thus the amount of light in the film optical waveguide 60 that the silicon layer 55 on the buffer layer 54 draws is reduced, which makes it possible to inhibit absorption of the light into the electrode part 22.

Note that the rib waveguide is exemplified as the film optical waveguide 60 for convenience of description; however, a channel waveguide may be used and changes can be made as appropriate.

According to one mode of an optical device disclosed herein, etc., it is possible to increase efficiency in applying an electric field.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical device comprising:
   an optical waveguide;
   a buffer layer that is layered on the optical waveguide;
   an opening that is formed at least in the buffer layer above a part near a side surface of the optical waveguide;
   an electrode that is layered in the opening and that is configured to apply a signal to the optical waveguide; and
   a silicon layer that is layered on the buffer layer excluding the opening.

2. The optical device according to claim 1, wherein the optical waveguide is provided in a given position on a film substrate,
   the buffer layer is layered on the film substrate, and
   the opening is formed in at least a part of the film substrate near the side surface of the optical waveguide and the buffer layer above the part.

3. The optical device according to claim 1, further comprising a silicon side opening that is formed in a part of the silicon layer overlapping the opening,
   wherein the optical device is structured such that the electrode that is layered in the opening is exposed from the silicon side opening and electrical contact is made between the electrode and the silicon layer.

4. The optical device according to claim 3, wherein the electrode that is exposed from the silicon side opening is structured such that a width of the electrode is wider than an opening width of the silicon side opening.

5. The optical device according to claim 3, wherein the silicon side opening is structured such that an opening width of the silicon side opening is wider than an opening width of the opening.

6. The optical device according to claim 1, wherein the optical waveguide is structured such that a thickness of the optical waveguide is larger than a thickness of the buffer layer that is layered on the optical waveguide.

7. The optical device according to claim 1, wherein the optical waveguide is an optical waveguide of a film lithium niobate (LN) crystal.

8. The optical device according to claim 7, wherein the optical waveguide is formed using an X-cut substrate of the film LN crystal.

9. The optical device according to claim 1, wherein the electrode is a radio frequency (RF) electrode.

10. The optical device according to claim 1, wherein the electrode is a direct current (DC) electrode.

11. An optical communication device comprising:
    a processor configured to execute signal processing on an electric signal;
    a light source configured to generate light; and
    an optical device configured to modulate the light that is generated from the light source using an electric signal that is output from the processor,
    wherein the optical device includes:
    an optical waveguide;
    a buffer layer that is layered on the optical waveguide;
    an opening that is formed at least in the buffer layer above a part near a side surface of the optical waveguide;
    an electrode that is layered in the opening and that is configured to apply a signal to the optical waveguide; and
    a silicon layer that is layered on the buffer layer excluding the opening.

* * * * *